June 21, 1938.  G. W. ELSEY ET AL  2,121,655
CONDUCTOR INSERTING MACHINE
Filed June 15, 1936   10 Sheets-Sheet 1

Inventors
GEORGE W. ELSEY
and LAWSON E. MUMMA
and EDWARD J. VOSLER

By Spencer, Hardman and Dehn
Attorneys

INVENTOR
GEORGE W. ELSEY
LAWSON E. MUMMA
BY EDWARD J. VOSLER
ATTORNEYS

June 21, 1938.　　G. W. ELSEY ET AL　　2,121,655
CONDUCTOR INSERTING MACHINE
Filed June 15, 1936　　10 Sheets-Sheet 3

INVENTORS
GEORGE W. ELSEY
LAWSON E. MUMMA
BY and EDWARD J. VOSLER
Spencer, Hardman and John
ATTORNEYS June 21, 1938. G. W. ELSEY ET AL 2,121,655
CONDUCTOR INSERTING MACHINE
Filed June 15, 1936 10 Sheets—Sheet 8

Inventor
GEORGE W. ELSEY
LAWSON E. MUMMA
and EDWARD J. VOSLER

By Spencer, Hardman and Fehr
Attorneys

June 21, 1938.  G. W. ELSEY ET AL  2,121,655

CONDUCTOR INSERTING MACHINE

Filed June 15, 1936   10 Sheets-Sheet 10

GEORGE W. ELSEY
LAWSON E. MUMMA
EDWARD J. VOSLER

Spencer Hardman
and John
Attorneys

Patented June 21, 1938

2,121,655

UNITED STATES PATENT OFFICE 2,121,655

CONDUCTOR INSERTING MACHINE

George W. Elsey, Lawson E. Mumma, and Edward J. Vosler, Dayton, Ohio, assignors to General Motors Corporation, Detroit, Mich., a corporation of Delaware Application June 15, 1936, Serial No. 85,322

27 Claims. (Cl. 140—140)

This invention relates to the manufacture of dynamo electric machines and more particularly to the manufacture of rotors for induction motors generally known as squirrel cage rotors.

In a recently developed rotor for induction motors, straight conductor bars of copper or other good conducting material are inserted in the rotor core and the projecting conductor ends are bent against the core ends, thus anchoring the conductors to the core, and also binding the core laminae together in case the core is laminated. The bent conductor ends may be short-circuited by any well-known means such as conducting end rings in contact with the bent conductor ends, or the conductor ends may be bent into overlapping engagement with each other, then swedged tightly together and finally fused into integral end connectors.

It is the primary aim and object of the present invention to provide a machine which rapidly and efficiently inserts straight conductor bars in concentrically disposed slots or holes of a rotor core.

It is a further object of the present invention to make provision in the machine for severing the conductor bars from a supply of bar stock.

It is another object of the present invention to provide for provisional anchorage of the conductor bars on the core to minimize the possibility of their escape from the core until properly anchored in a subsequent operation.

It is another object of the present invention to adapt the machine for operation on either a solid core or on a laminated core.

It is another object of the present invention to provide for automatic operation of the machine to such an extent that an operator is merely required to place a core on the machine, to start the operation of the machine, and to remove the core, with all conductors inserted, from the machine.

These and other objects are accomplished by locating a core on a rotatable disc, so that both may be rotated in unison about the core axis. This disc is bodily immovable and has provisions for locating a core thereon such that the concentrically disposed, conductor receiving holes of the core align with like disposed and dimensioned holes in said disc. An orificed stationary guide which abuts the disc receives the leading end of a supply of bar stock to direct the same into aligned holes of the disc and core. The bar stock is fed into these aligned holes until a proper length thereof has been advanced into the disc and core, whereupon the disc is indexed to bring the consecutive, aligned holes of disc and core into registry with the stationary guide. The orifice in the guide and each hole in the abutting disc terminate in adjacent edges which are adapted to cooperate as shears for severance of an inserted length of bar stock from the supply. Thus, the guide and a presently registering hole in the disc cooperate from the very start of an indexing operation and sever an inserted conductor length from the bar stock. The length of the projecting conductor ends at both core ends is determined by the amount of feed of the bar stock and by the spacing of the shearing edges on the disc from the core. By alternately feeding the bar stock and indexing the disc, each successive hole of the core receives a conductor. The operating units of the machine which feed the bar stock and index the core carrying disc, are alternately operated by a common prime mover. Provisions are further made for automatically stopping the operation of the machine after a core has received the required number of conductors.

To adapt the device for a laminated core which has the usual central opening for receiving the rotor shaft and at least two eccentrically disposed openings to reduce the weight of the core and to afford ventilation therethrough, the disc is provided with projecting locating pins which are so disposed as to extend throughout said openings when the core rests on the disc, thus maintaining the conductor receiving holes of the core laminae in perfect alignment for reception of the conductors and also preventing relative rotation of the core on the disc. A suitable clamp presses the core laminae against the disc and prevents their removal from the locating pins.

Further objects and advantages of the present invention will be apparent from the following description, reference being had to the accompanying drawings wherein a preferred embodiment of the present invention is clearly shown.

In the drawings:

Fig. 7 is a side elevation of the machine and is viewed in a direction opposite to that in which Fig. 5 is viewed.

Fig. 12 is a fragmentary section taken substantially on the line 12—12 of Fig. 7.

Fig. 13 is a section taken substantially on the line 13—13 of Fig. 12.

Figure 15:
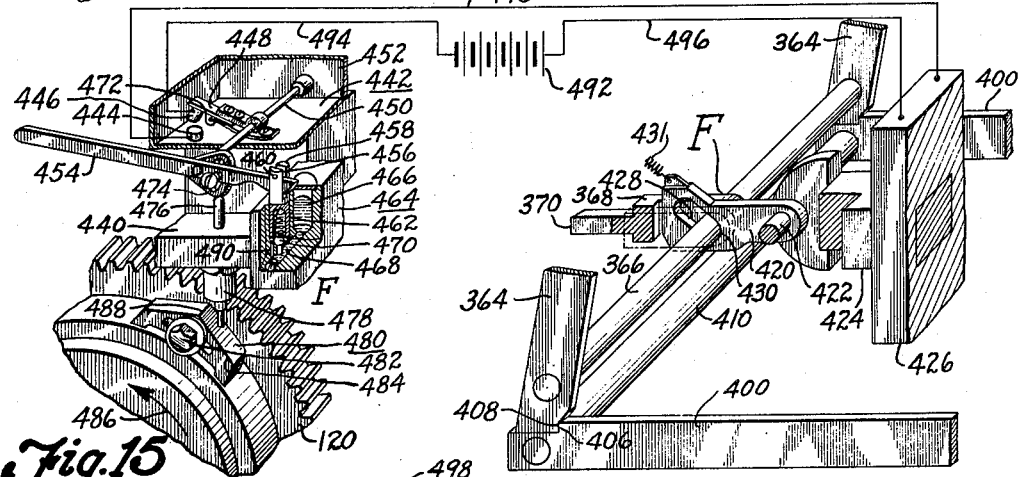
Fig. 15 is a diagrammatic illustration of a certain control of the machine.

The present machine provides a base 20 on which is mounted a main frame 22, supporting the various operating devices of the machine. These devices or units may be divided in a core locator A (Fig. 3), an indexing device B (Fig. 5), a feeding device C (Fig. 5), a starter E (Fig. 7), and an automatic stop F (Fig. 15). These units will now be described in detail in the order just mentioned.

*Core locator A*

Figure 3:
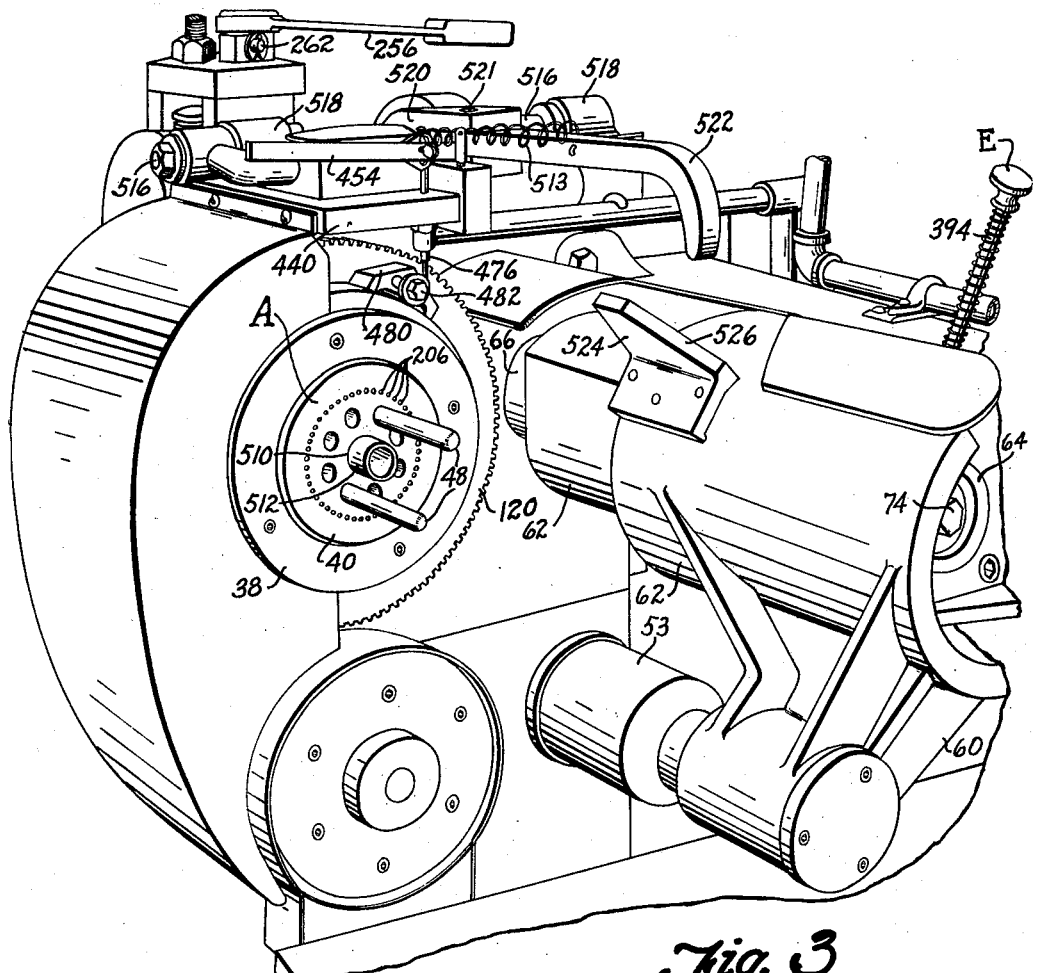
Fig. 3 is a fragmentary perspective view of a machine embodying the present invention.
Figure 10:
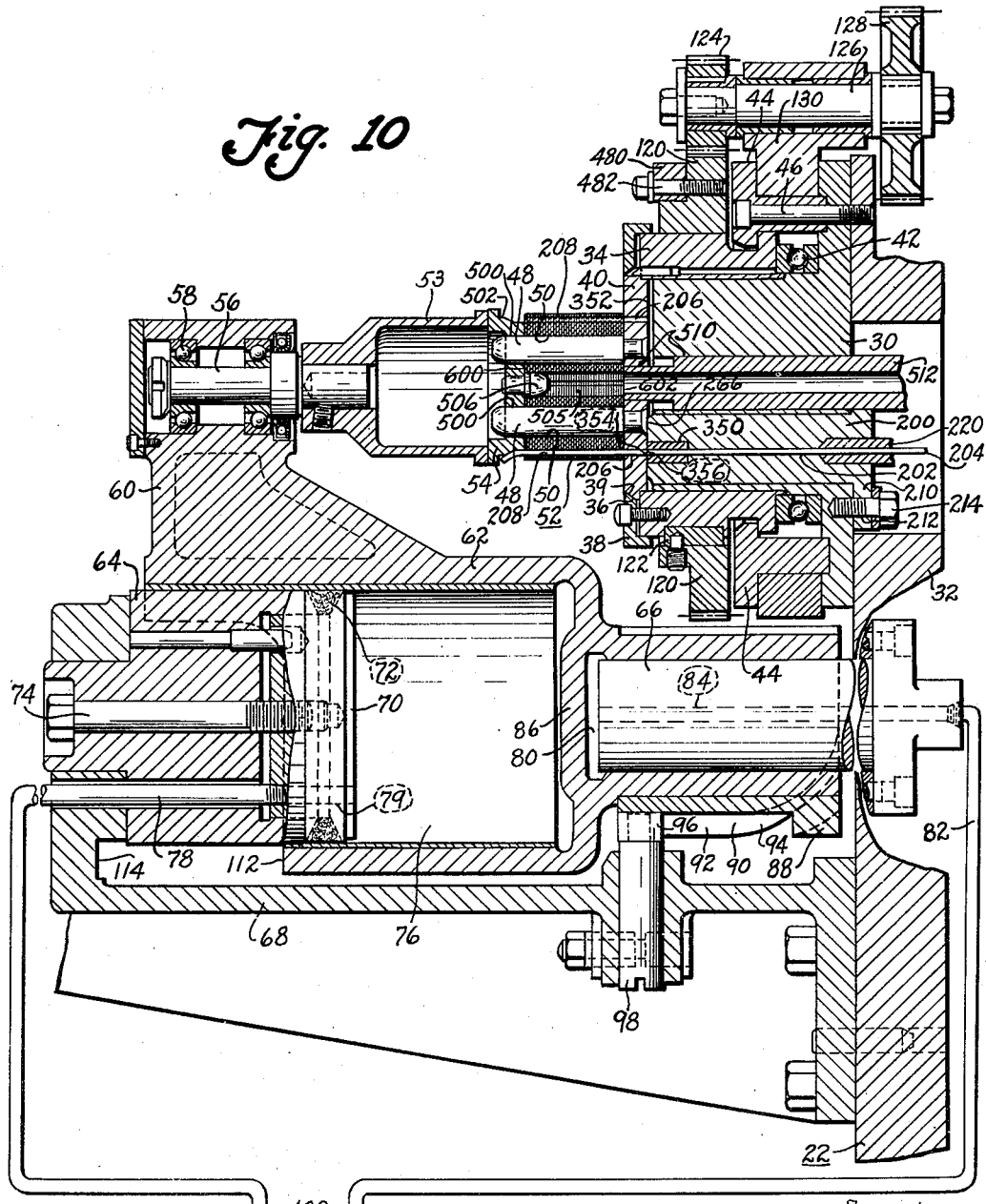
Fig. 10 is an enlarged, fragmentary section taken substantially on the line 10—10 of Fig. 9.

Referring more particularly to Figs. 3 and 10, a cylindrical support 30 is suitably mounted on an upright wall 32 of the main frame 22. A sleeve 34 is journaled on support 30. The frusto-conical surface 36 of a retainer 38 cooperates with frusto-conical surface 39 of a locating plate or disc 40 and clamps the latter firmly against the shell 34. Axial movement of shell 34 in one direction is prevented by a thrust bearing 42, and in the other direction by a retainer 44 which is secured to the frame wall 32 by bolts 46. Thus, the shell 34 and the locating disc 40 may rotate in unison on the support 30 but cannot move axially thereon. Projecting from the disc 40 are at least two locating pins 48, each to receive a longitudinal recess 50 of a rotor core 52 which for all intents and purposes may be a solid one or made up of laminations. The recesses 50 are usually provided in a rotor core to reduce its weight and to afford ventilation of the core.

A clamp 53 is adapted to force a core 52 against the locating disc 40 through intermediation of a dish-shaped member 54, the proper function of which will be described later. Clamp 53 is mounted on a stub shaft 56 which is rotatable in combined thrust and journal bearings 58 of an extending arm 60, integral with a cylinder 62 which is journaled and longitudinally slidable on axially aligned, stationary pistons 64 and 66. Piston 64 is mounted on a bracket 68 on the frame wall 32, while piston 66 is directly mounted on said frame wall 32. A retainer 70 for a packing 72 is secured to the piston 64 by a bolt 74. Any fluid under pressure may be introduced to side 76 of cylinder 62 by means of a conduit 78 which extends through the stationary piston 64 and communicates with a passage 79 of the retainer 70. Fluid under pressure is admitted to the other side 80 of cylinder 62 through a conduit 82 and a communicating passage 84 in piston 66. Both cylinder sides 76, 80 are separated by a partition 86. Mounted in any suitable manner on cylinder 62 is a segment 88 which provides a cam groove 90, having a straight portion 92 merging into a spiral portion 94. This cam groove cooperates with a roller 96, carried by a stub 98 which is suitably secured to the bracket 68. The cooperation between cam groove 90 and roller 96 is such that during an initial cycle of withdrawal of cylinder 62 from the position in Fig. 10, the straight groove portion 92 cooperates with the roller 96 to prevent rotation of the cylinder on its piston support, and during the remaining cycle of withdrawal of the cylinder the spiral groove portion 94 cooperates with the roller 96 to cause a rocking of the cylinder into the position shown in Fig. 3 in which the clamp 53 is clearly out of alignment with the locator 40, hence does not interfere with the removal of a core from, or deposition of a core on, said locator. Any suitable valve, such as the diagrammatically illustrated double-acting valve 100 may be applied for controlling the admission of fluid pressure to either side of cylinder 62. The perspectively illustrated valve 100 in Figs. 4, 5, 7, 8 and 9 is a well-known commercial valve which acts in a manner similar to the diagrammatically illustrated valve in Fig. 10. Since the construction of the perspectively illustrated valve 100 does not form any part of the present invention, no specific description or detailed illustration thereof is deemed necessary, instead reference is had to the diagrammatically illustrated valve in Fig. 10. This valve includes a casing 102, receiving a sliding valve 104 which may be shifted from the full-line position into the dot-and-dash position or vice versa by any suitable means (not shown). The conduits 78 and 82 communicate with the casing 102 and a third conduit 106 provides permanent communication between said casing and any suitable source of fluid pressure (not shown). In the full line position of the valve 104 in Fig. 10, fluid pressure is admitted to the cylinder side 76, while the other cylinder side 80 is vented through another conduit 108, resulting in exertion of a yielding force by clamp 53 against the located core 52. Upon shifting of the valve from the full-line position into the dot-and-dash position of Fig. 10, fluid pressure is admitted to cylinder side 80, while the other cylinder side 76 is vented through a longitudinal passage 110 in valve 104 and the communicating conduit 108. Such admission of fluid pressure to cylinder side 80 causes cylinder 62 with clamp 53 to recede from the position in Figs. 4 and 10 to that shown in Fig. 3, during which movement clamp 53 is rocked out of alignment with the located core 52 due to the explained cooperation between cam groove 90 and roller 96. Receding movement of cylinder 62 is stopped upon engagement of its face 112 with the arch 114 of bracket 68, i. e., before the cylinder partition 86 strikes against the packing retainer 70 of piston 64 and before the cylinder clears the other piston 66.

*Indexing device B*

Referring more particularly to Figs. 5, 7, 10, and 11, a ring gear 120 is keyed at 122 to the shell 34. Meshing with this ring gear is a pinion 124 which is mounted on a stub shaft 126, carrying another gear 128. Stub shaft 126 is journaled in a suitable bearing, provided by a carrier 130 which is journaled on the retainer 44 and locked thereon in angularly adjusted position by any suitable means (not shown).

Gear 128 is in mesh with a pinion 132 (see also Figs. 5 and 9) which is mounted on a stub shaft 134, journaled in a bearing 136, provided by the frame wall 32. Also mounted on the stub-shaft 134 is a Geneva driven gear 138 which cooperates with a Geneva driving gear 140, mounted on one end of a rotary shaft 142 (see also Fig. 11) which is suitably journaled in a ball bearing 144 of a tubular bracket 146, suitably secured to the frame wall 32. The other end of shaft 142 is splined at 150 and nearby journaled in a ball bearing 152 that is carried by a member 154, secured to the frame wall 148. The splined shaft end 150 receives the driven member 156 of a jaw clutch 158, the driving member 160 of which is journaled in ball bearings 162 of a bearing bracket 164. Mounted on the driving clutch member 160 is a flange 166 to which another flange 168 is secured by screws 170. Secured to the flanges 166, 168 are rings 172 and 174 of L-shaped cross-section which cooperate to form an annular groove 176 of U-shaped cross-section. Received in this groove 176 and journaled on the cylindrical bottom 177 thereof is the spider 178 of a pulley 180, having a multitude of V-shaped peripheral grooves 182, each of which receives a V-belt 184, driven by a similar but smaller pulley 186 on the shaft 188 of an electric motor 190 which is mounted on the base 20. Rotation of pulley 180 is frictionally transmitted to the driving clutch member 160 by a plurality of compressed springs 192 which are retained in flange 168 and bear against ring 174. Such frictional torque transmission from the pulley 180 to the driving clutch member 160 will effectively prevent serious damage to the just described drive of the indexing device in case the indexing of the core locator 40 should be obstructed in some unforeseen manner. It can now be understood that the running motor 190 causes intermittent rotation or indexing of the core locator 40 through intermediation of pulley 186, belts 184, pulley 180, clutch 158, shaft 142, Geneva gears 140 and 138, meshing gears 132 and 128, pinion 124 and meshing ring gear 120.

Feeding device C

Referring more particularly to Figs. 5 to 8 and 10 to 13, inclusive, the support 30 has journaled therein a guide 200 which has a longitudinal passage 202 for receiving and directing bar stock 204 through holes 206 of the locating disc 40 and aligned holes 208 of a core 52 thereon. The holes 208 and 206 of core 52 and locating disc 40, respectively, are congruent and disposed concentrically of the aligned axes of the core and locating disc. The stock receiving and directing passage 202 of guide 200 is disposed eccentrically of its axis of rotation in support 30 to facilitate accurate alignment of said passage with a hole 206 of disc 40, which is also angularly adjustable as has been previously explained. The guide 200 is provided with a lateral lug 210, having a slot 212 which is concentric of the axis of rotation of guide 200 in support 30 and receives a screw 214, threaded into support 30 and locking guide 200 in properly adjusted angular position to said support. Near the guide 200 are two feeding discs 216 and 218 which cooperate to draw bar stock 204 from a suitably stored supply and to advance the same through a tubular guide 220 (see Figs. 5 and 10) and continuing guide 200 into aligned holes 206, 208 of locater 40 and core 52 thereon. As best shown in Fig. 12, the feeding discs 216, 218 have peripheral grooves 222, the bottoms of which are serrated and adapted to grip the bar stock 204 from opposite sides. When one pair of cooperating peripheral grooves 222 becomes so worn as to become unfit for further feeding, the discs 216, 218 are turned around and the other pair of cooperating grooves 222 is then used for feeding the bar stock. This does not in the least interfere with the proper guidance of the bar stock by the guides 220 and 200 since the grooves 222 of each disc 216, 218 are equally spaced from the plane of symmetry 223 thereof. The feeding disc 216 is mounted on a shaft 224 which is journaled in bearings 226 and 228, provided by the main frame 22. Keyed at 230 to shaft 224 is the driven member 232 of a conventional over-running clutch 234 on which a ring gear 236 is mounted. This ring gear is in mesh with a gear 238, the ratio between both being 1:1. Gear 238 is mounted on a shaft 240 which carries the feeding disc 218 and is journaled in a bearing 242, provided by a bracket 244 which is pivotally mounted at 246 to the main frame 22. Pivoted at 248 to a lug 250 of bracket 244 is a spindle 252 which passes freely through a platform 254 of the main frame 22 and threadedly receives at its free end a hand lever 256, the hub 258 of which is provided with two diametrically opposite, concave notches 260, normally registering with correspondingly disposed rollers 262 of a sleeve 264 through which the spindle 252 passes freely. Rocking of the hand lever 256 about the non-rotatable spindle 252 results in disalignment of the concave notches 260 from the rollers 262 and consequent slight rocking of bracket 244 clockwise as viewed in Fig. 12. In this manner the feeding cooperation between the discs 216, 218 may be interrupted at random. This feature is of significance primarily when a new supply of bar stock is power fed in the machine and the feeding to be stopped shortly after the leading end of the new bar stock has passed the end face 266 of guide 200, i. e. prior to a complete feeding operation. A retainer 268 which is threadedly received by the platform 254, forces a compression spring 270 against the bracket 244, permanently urging the same in counter-clockwise direction as viewed in Fig. 12. In order that the bar stock 204 is yieldingly gripped by the feeding discs 216 and 218, the concave notches 260 of the hand lever 256 and the rollers 262 are so coordinated that there is a slight clearance therebetween when the feeding discs are in engagement with the bar stock thus permitting the spring 270 to exert its compression to the feeding disc 218. Freely rotatable on shaft 224 and cooperating with the driven member 232 of the over-running clutch 234 is a driving member 272, having a number of equi-angularly spaced peripheral notches 274 (see Fig. 13) and carrying a plurality of spring-urged plungers 276 which urge the rollers or balls 278 into coengagement with the steel lined notch walls 280 of the driving member 272 and the inner race 282 of the driven member 232. It is self-evident that counter-clockwise rotation of the driving member 272 as viewed in Fig. 13 results in driving engagement between the clutch members through intermediation of the balls 278, while clockwise rotation of the driving member 272 does not effect like rotation of the driven member 232, the balls 278 being then frictionally urged against the spring-urged plungers 276 as can be readily understood. Mounted on the main frame 22 is a block 284, having a rectangular recess 286 on the bottom of which is mounted a steel plate 288, serving as a wear piece and as a guide for a socket 290 which provides a cavity 292 to receive a roller 294. The cavity 292 breaks through the socket member 290 adjacent plate 288 so that the roller 294 bears against said plate, yet is contained in the socket cavity 292. A spring-urged plunger 296 engages the socket member 290 and normally forces the roller 294 into co-engagement with plate 288 and the outer periphery of the driven clutch member 232. It can now be understood that the spring-urged roller 294 exerts an instantaneous braking force on the driven clutch member 232 upon the slightest clockwise rotation of the same as viewed in Fig. 13. The driven clutch member 232 is thus prevented from backing-up or following the driving clutch member 272 when the latter rocks in contra-feeding direction. Another brake 300 causes such a permanent drag on the driven clutch member 232 as successfully to prevent over-travel of the same in feeding direction when the driving clutch member 272 suddenly reverses its direction of rotation after a completed feeding operation. Also journaled on shaft 224 and suitably coupled to the driving clutch member 272 is a crank arm 302 which is connected to a lever 304 by means of links 306. Lever 304 is pivotally mounted at 307 to the main frame 22 and provides a straight slot 308 (see Figs. 6 and 7) which slidably receives a crank pin 310, radially adjustably mounted by means of a screw 312 and a clamping member 314 in a radial groove 316 of a disc 318 (see also Fig. 11). The disc 318 is mounted on one end of a shaft 320, journaled in a ball bearing 322 of a tubular bracket 324 which is suitably secured to the frame wall 32. The other, reduced end 326 of shaft 320 journals a bevel gear 328 which is further journaled in a ball bearing 330, housed in the tubular bracket 324. A shoulder 332 of shaft 320 is provided with two diametrically opposite notches 334 which receive two lugs 336 of a bevel gear 328 to establish driving connection between gear and shaft. A lock nut 338 retains gear 328 in place. Meshing with the bevel gear 328 is another bevel gear 340, journaled on shaft 142 and having two diametrically opposite lugs 342 in registry with notches 344 in a shoulder 143 of shaft 142. A lock nut 346 retains gear 340 in place and a ball bearing 348 serves as an additional journal for said gear. The ratio between the bevel gears 328, 340 is 1:1. It can now be understood from the preceding description that one revolution of shaft 142 results in one oscillation of the driving member 272 of the over-running clutch 234 through intermediation of gears 340 and 328, shaft 320, disc 318, crank pin 310, lever 304, links 306 and crank arm 302. Further, rocking of the driving clutch member 272 in one direction, i. e. counter-clockwise as viewed in Fig. 13, results in simultaneous rotation of the discs 216, 218 in feeding direction through intermediation of driven clutch member 232, shaft 224, meshing gears 236, 238 and shaft 240.

*Conductor severing provision D*

Figure 1:
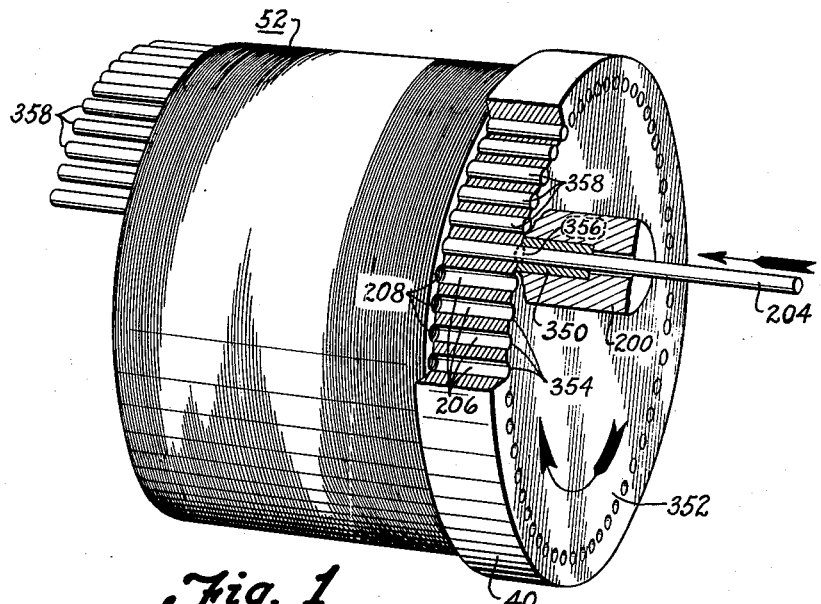
Fig. 1 illustrates diagrammatically the deposition of conductors in a rotor core as carried out in the present machine.

Referring more particularly to Fig. 10, the guide 200 has an inserted steel bushing 350 which is flush with the end face 266 of guide 200 and abuts the locating disc 40 which is also of steel. The abutting end face 352 of the locating disc 40 is accurately machined, preferably ground, to provide sharp circular edges 354 where each of the holes 206 merges into said end face. These edges 354 are adapted to cooperate with the circular edge 356 of the stationary steel bushing 350 in shearing conductors from the bar stock. Thus, immediately upon disalignment of a stock containing hole 206 of the locator 40 from the bushing 350, the shearing edges 354 and 356, respectively, thereof cooperate to sever a conductor 358 in the abutting plane of disc 40 and bushing 350. The shearing of a conductor 358 from the bar stock 204 is also depicted in Fig. 1. It can now be understood that consecutive holes 206 of a located core 52 successively receive conductors 358 from the bar stock 204 upon proper feeding of the bar stock in alternation with the indexing of the core.

*Starter E of machine*

Figure 7:
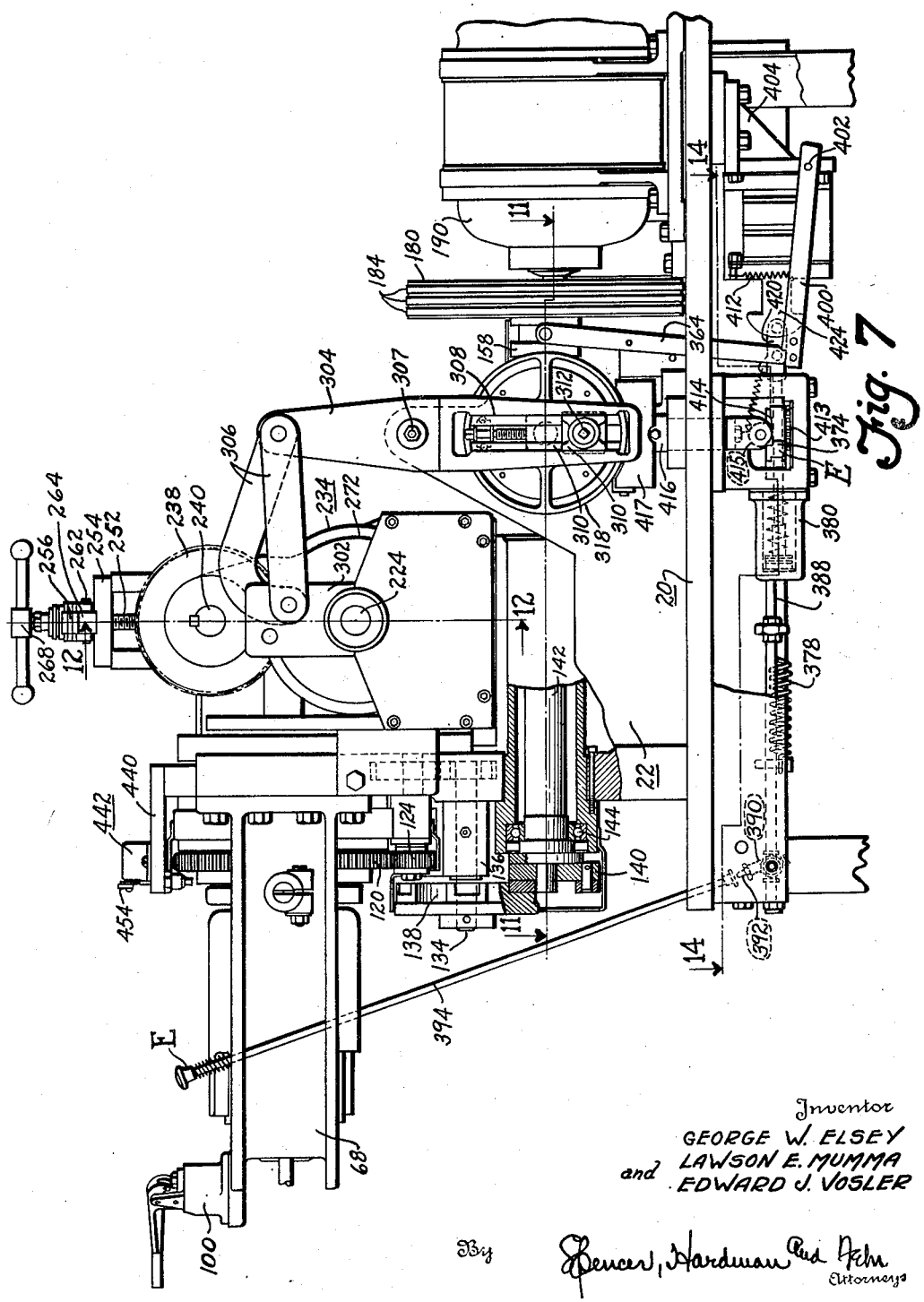
Figure 8:
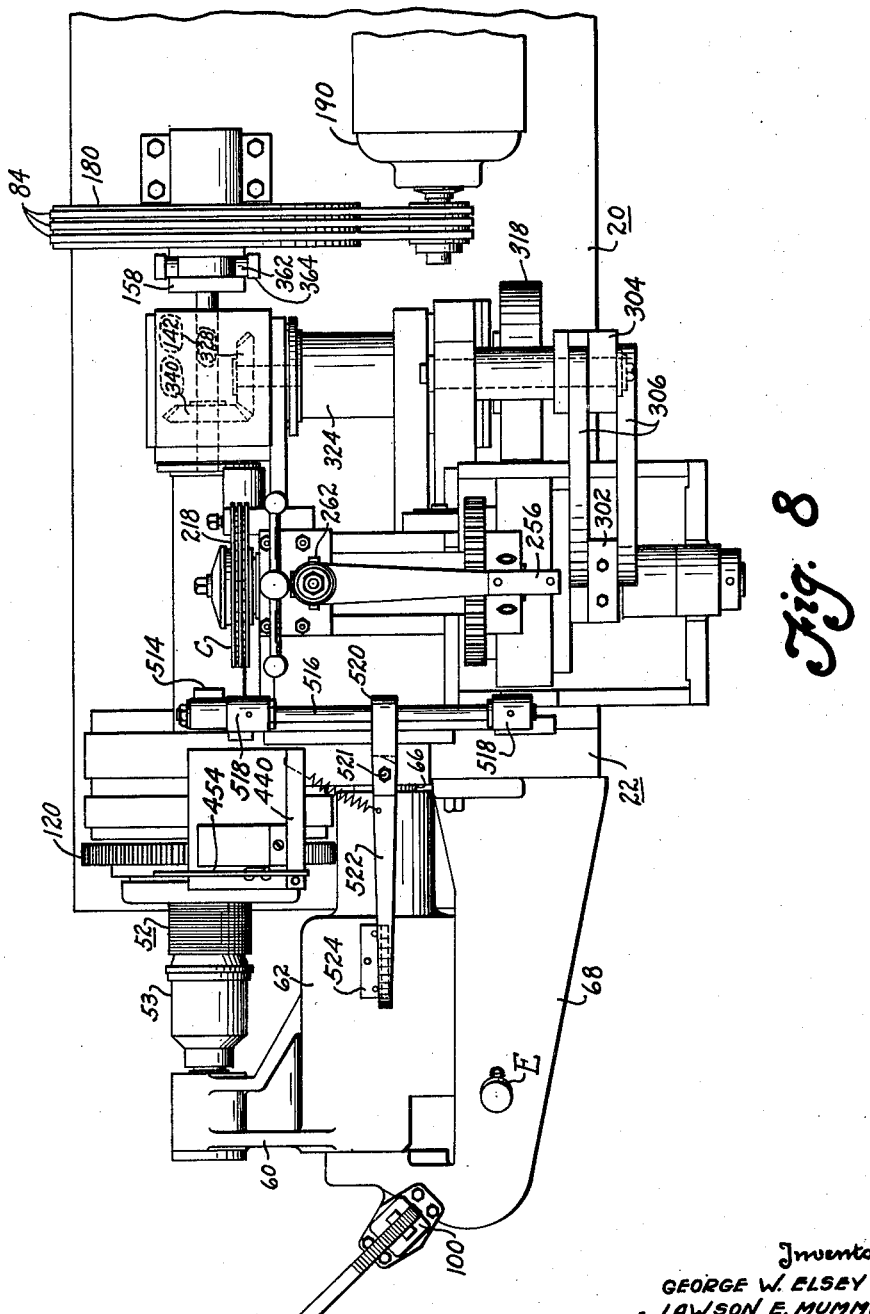
Fig. 8 is a plan view of the machine.
Figure 9:
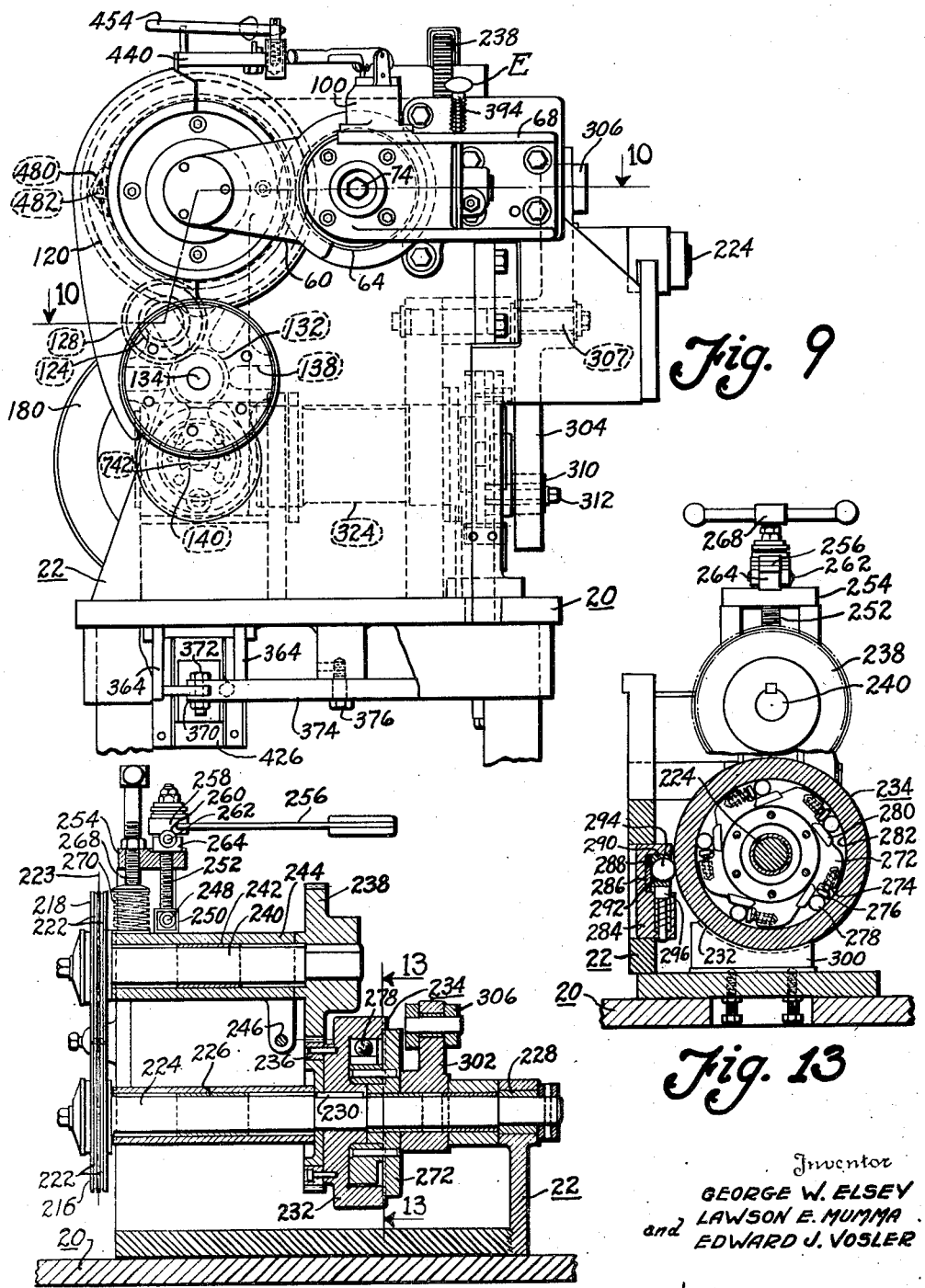
Fig. 9 is a fragmentary front elevation of the machine.
Figure 11:
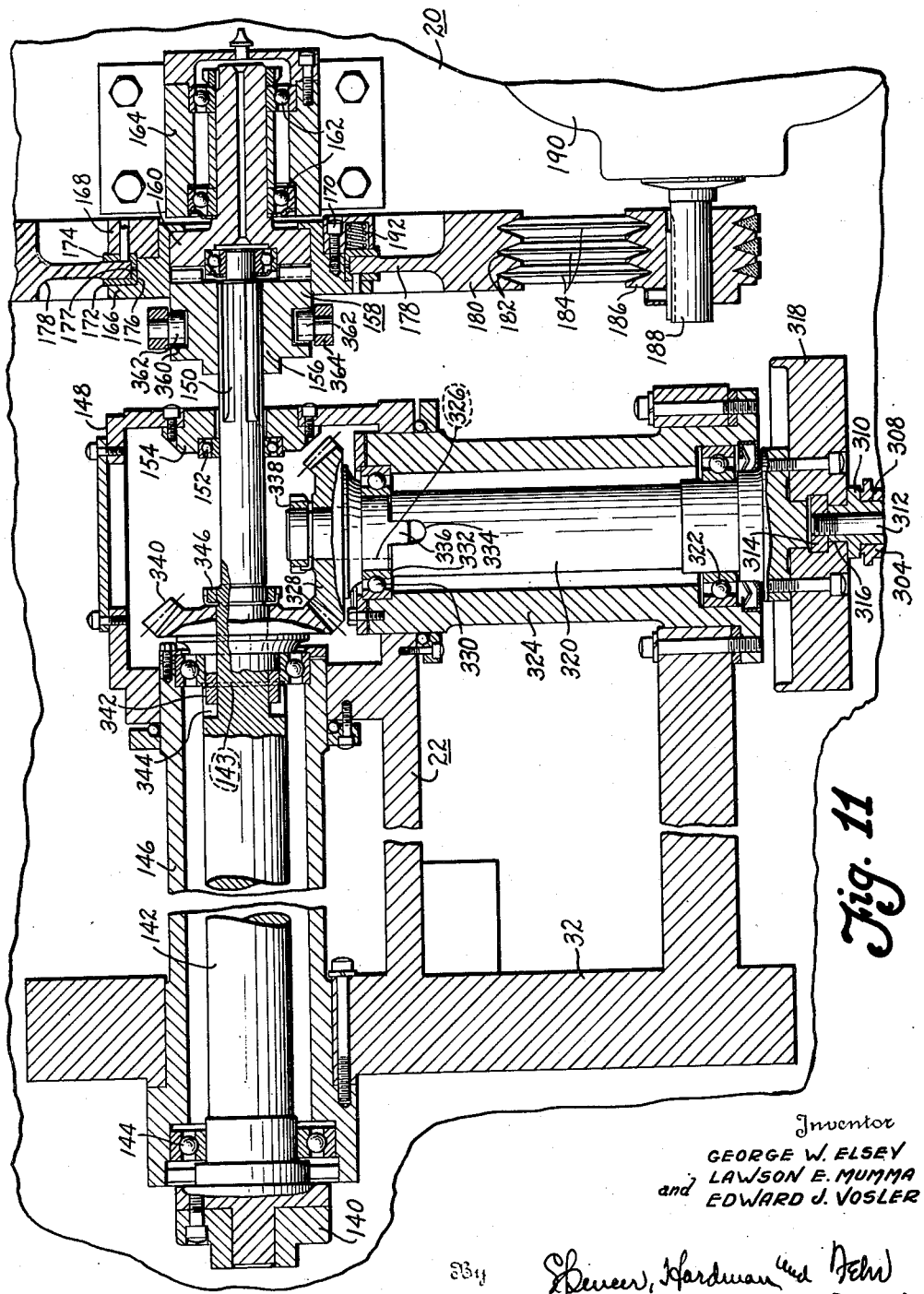
Fig. 11 is an enlarged, fragmentary section taken substantially on the line 11—11 of Fig. 7.
Figure 14:
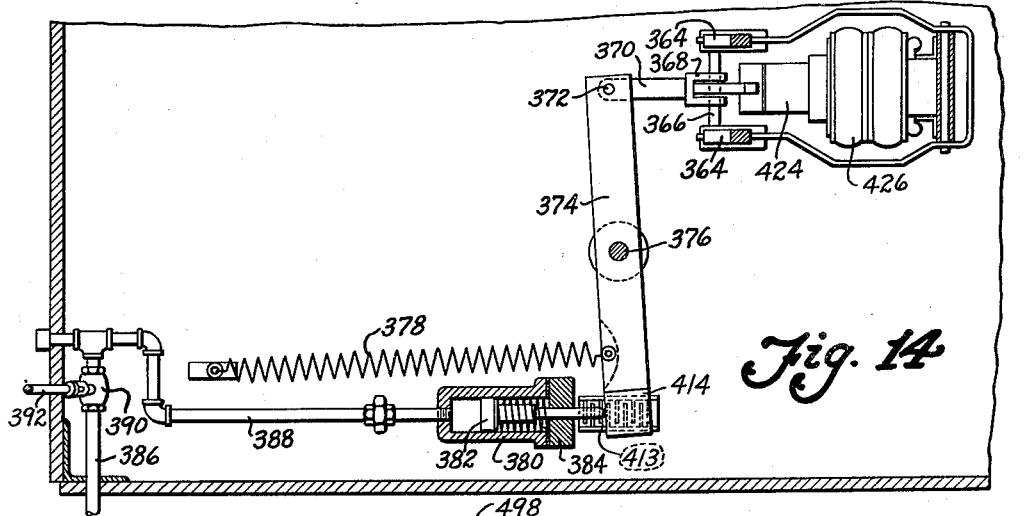
Fig. 14 is a fragmentary section taken substantially on the line 14—14 of Fig. 7.

Referring more particularly to Figs. 7, 11 and 14 the driven member 156 of the jaw clutch 158 is peripherally grooved at 360 to receive opposite rollers 362 of a shifter fork 364 which is joined at its lower end by a cross bar 366 (see also Fig. 15). Pivoted on the cross-bar 366 is the clevis 368 of a link 370 which is also pivotally connected at 372 to a double-arm lever 374, pivotally mounted at 376. A tension spring 378 normally tends to rock lever 374 clockwise as viewed in Fig. 14 to rock the shifter fork 364 into the clutch disengaged position indicated in Fig. 16. To cause clutch engagement, fluid under pressure from any suitable supply (not shown) is admitted to a cylinder 380 to force a plunger 382 therein to the right as viewed in Fig. 14, thereby engaging and rocking lever 374 from clutch disengaged position into the clutch engaging position shown in Fig. 14. A compression spring 384 normally urges the plunger 382 to the left as viewed in Fig. 14. Fluid under pressure is admitted to the cylinder 380 through conduits 386 and 388 and an intermediate valve 390. This valve may be of any well known commercial type which is preferably so constructed that depression of the valve stem 392 permits the passage of fluid pressure from conduit 386 to conduit 388 and into the cylinder 380. Normally, valve stem 392 is urged into the position shown in Fig. 7 in which communication between the conduits 386 and 388 is intercepted and the cylinder 380 is vented through conduit 388 and the valve 390. Since the construction of the valve 390 does not form any part of the present invention, no detailed description or disclosure thereof is deemed necessary. In order that the operator of the machine may conveniently start an operation of the machine by engaging the clutch 158 without leaving his normal position adjacent the front end of the machine, a push-rod 394 is conveniently provided for remote compression of the valve stem 392. In order to prevent premature disengagement of clutch 158 while the machine is operating, suitable locking means are provided in the form of parallel arms 400 which are pivotally mounted at 402 to a bracket 404 which is suspended from the base 20. Each one of these arms is provided with a shoulder 406 which is adapted to interlock with a similar shoulder 408 on each leg of the clutch shifter fork 364 as best shown in Figs. 7 and 15. A cross-bar 410 joins the free ends of the locking arms 400 which are normally urged into locking engagement with the shifter fork 364 by a tension spring 412. It can now be understood that upon rocking of the shifter fork 364 from clutch disengaging position to clutch engaging position, the shoulders 406 of the locking arms 400 will automatically interlock with the shoulder 408 of the shifter fork 364 and prevent clutch disengagement.

Lever 374 rests with one end on a thrust bearing 413. This end of the lever 374 also provides a cam surface 414 which is adapted to cooperate with the roller 415 of a bar 416 (see Fig. 7), slidable vertically through the base 20 and carrying at its upper end a brake member 417 that is to brake the disc 318 of the indexing device B when the lever 374 is rocked into clutch disengaging position, as can be readily understood.

*Automatic stop F*

Figure 16:
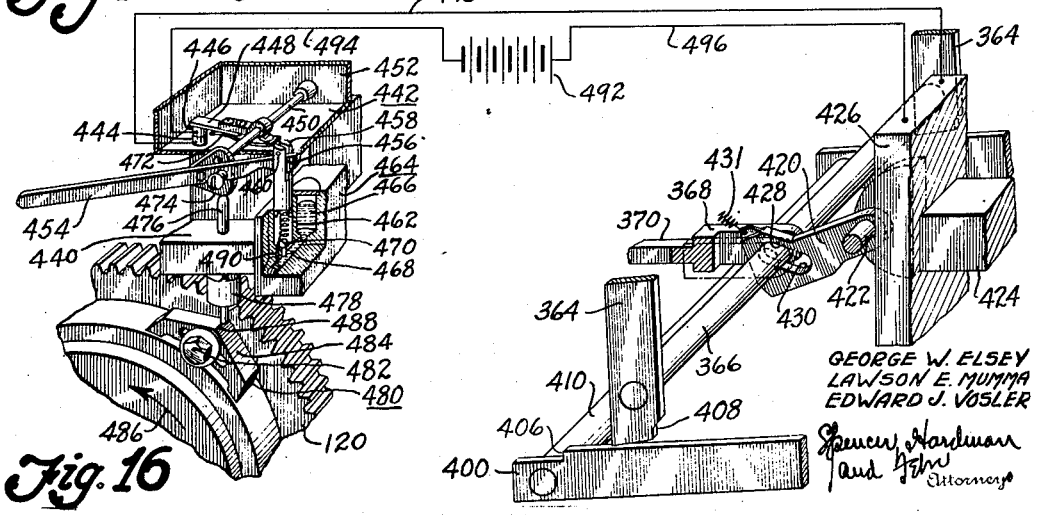
Fig. 16 is a view similar to Fig. 15, showing certain elements in a different position of operation, however.

Referring more particularly to Figs. 14 to 16 inclusive, a link 420 is with one end floatingly pivotally connected to the cross bar 366 of the shifter fork 364. The other end of said link 420 is pivoted at 422 to the armature 424 of a solenoid 426 which is mounted on the bracket 404 (see Fig. 7). The floating pivotal connection between member 420 and cross bar 366 is accomplished by an inclined slot 428 in said member through which the cross bar 366 passes. The inclination of the slot 428 is such that upon energization of the solenoid 426 and consequent withdrawal of the armature 424 from the position shown in Fig. 15 to that shown in Fig. 16, the member 420 is rocked counter-clockwise as viewed in Fig. 15 about its pivot 422, thereby engaging and rocking the cross bar 410 of the locking arms 400 counter-clockwise as viewed in Fig. 15, i. e. out of locking engagement with the shifter fork 364 which thereupon immediately rocks into clutch disengaging position under the tension of spring 378 (see Fig. 14). Fig. 16 shows the relative positions of the member 420, the armature 424, the shifter fork 364 and the locking arms 400, after clutch disengagement. Any suitable means, such as a spring (not shown) urges the armature 424 into the most advanced position shown in Fig. 15 in which the end wall 430 of the inclined slot 428 bears against the cross bar 366 of the shifter fork 364. A tension spring 431 is also effective to urge the end wall 430 of the inclined slot 428 against the cross-bar 366 of the shifter fork. Furthermore, member 420 is of such length that it will remain in engagement with the cross bar 410 of the locking arms 400 underneath, even when the shifter fork is in the clutch disengaging position in Fig. 16, thus avoiding interference between said member 420 and the locking arms 400 upon reengagement of the clutch. During such reengagement, the member 420 and armature 424 yieldingly follow the shifter fork 364 with the end wall 430 of the inclined slot 428 in engagement with the cross bar 366 of said shifter fork, thus holding the member 420 in the raised position in which it does not interfere with the locking of the shifter fork in clutch engaging position by the arms 400.

Mounted on a platform 440 which is suitably secured to the main frame 22, is a switch 442 (see also Figs. 15 and 16) which has a stationary contact 444 and another contact 446, mounted on a slightly resilient blade 448 which is in turn mounted on a rotatable stub 450, suitably journaled in the switch housing 442. Secured to a projecting end of stub 450 is an operating lever 454, one end of which is received in a longitudinal slot 456 of a plunger 458 and retained therein by a pin 460. This plunger is received in a cylinder cavity 462 of a dashpot 464 which is also provided with a reservoir 466 and a duct 468, providing communication between the cylinder cavity and the reservoir which contains a supply of any suitable fluid. A spring-urged ball 470 acts as a check valve between the cylinder cavity 462 and the duct 468. The switch blade 448 is normally held in the open position shown in Fig. 15 by a suitable spring 472. Angularly adjustable on the switch lever 454 is a lug 474 which is adapted to cooperate with a pin 476, slidable through the platform 440 and normally yieldingly urged against said lug 474 by a spring (not shown) which is housed in a suitable spring retainer 478. This spring is not strong enough to overcome the tension of spring 472 which holds the switch blade 448 in open position. Adapted to cooperate with pin 476 is a cam lug 480 which is angularly adjustably mounted at 482 to the ring gear 120 (see also Fig. 10). The inclined surface 484 of the cam lug 480 is adapted to force the pin 476 from the position shown in Fig. 15 to that shown in Fig. 16 during rotation of the ring gear 120 in the core indexing direction as indicated by arrow 486 in Figs. 15 and 16. Such movement of the pin 476 results in rocking of the switch blade 448 from the open position in Fig. 15 to the closed position in Fig. 16 and partial withdrawal of the plunger 458 from the cylinder cavity 462 of the dash-pot 464, thereby drawing fluid from the reservoir 466 through the duct 468 and past the yielding valve 470 into the cylinder cavity 462. The valve 470 closes under its spring compression as soon as the switch lever 454 stops in the position shown in Fig. 16 in which the crest 488 of the cam lug 480 cooperates with the pin 476. The fluid which is then trapped in the cylinder cavity 462 prevents instantaneous opening of the switch 442 under the tension of spring 472 even though the pin 476 returns into the lowermost position in Fig. 15 upon continued rotation of the ring gear 120 and consequent disalignment of the cam crest 488 from the pin 476. The dashpot 464 is provided with a narrow bypass 490 through which the trapped fluid leaks back into the duct 468 and reservoir 466 under the inducement of spring 472 which tends to open the blade 448 and to force the plunger 458 into the cylinder cavity 462 as can be readily understood. The contacts 444 and 446 will be in engagement for some time since the bent blade 448 will first recover before moving contact 446 out of engagement with the stationary contact 444. Thus, the dash-pot 464 prolongs the period during which the normally open switch 442 is closed, independently of the switch closing cam lug 480. This prolonged period during which the switch is closed assures that the solenoid 426 is energized sufficiently long to enable its armature 424 to overcome the considerable friction between member 420 and cross-bar 410 while drawing the former from the position shown in Fig. 15 to that shown iin Fig. 16. Any suitable source of electric power, such as a storage battery 492, may be used as a power source for the solenoid 426. Suitable leads 494, 496 and 498 connect the power source 492 with the contacts 446, 444 of the switch 442 and with the winding of the solenoid 426.

*Provisional anchorage of conductors to core*

Figure 2:
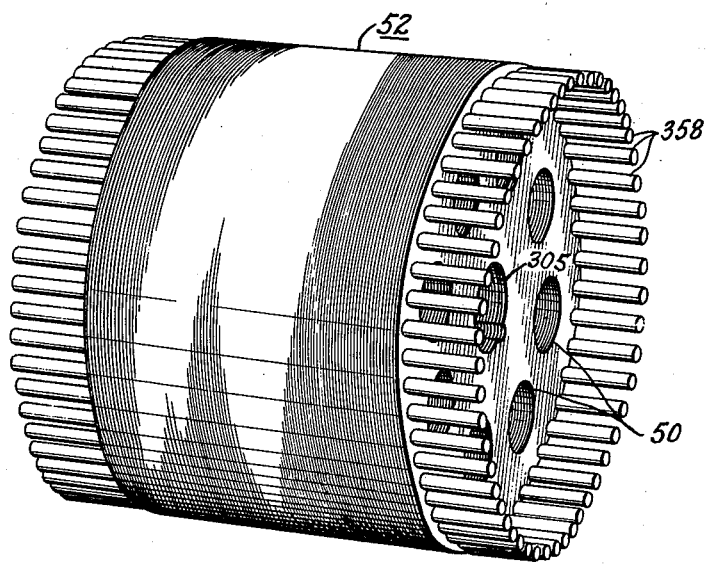
Fig. 2 is a perspective view of the same core after reception of all conductors.

Referring more particularly to Fig. 10, the earlier mentioned member 54 which is interposed between the clamp 53 and a located core 52, is provided with recesses 500 that register with the locating pins 48 of the locator 40 in order that the frusto-conical surface 502 of said member is concentric of the circularly disposed conductor receiving holes 208 of the core 52. This frusto-conical surface 502 is of such size that the leading end of the fed bar stock 204 is slightly deflected thereby as it leaves a core hole 208. The deflection of the leading end of the bar stock is for better illustration shown exaggerated in Fig. 10. In this manner all conductors are slightly bent radially outwardly, and their removal by gravity in one direction from the core 52 is effectively prevented, thus facilitating handling of a loose rotor assembly of core 52 and inserted conductors 358 after removal from the present machine. The slight deflection of one end of the conductors is hardly noticeable, and no effort has been made to illustrate the same in Figs. 1 and 2. The deflecting member 54 is usually removed from the machine together with a core 52, the deflected conductor ends establishing a yielding holding connection between member and core. Preferably, several of these members 54 are at the disposal of the operator, so that a member does not have to be immediately removed from a core and instead may be retained thereon after removal from the present machine and until the core is placed in another machine that bends the projecting conductor ends against the adjacent core ends. Such a conductor bending machine is provided with the customary locator, having preferably a projecting pin which passes through the central opening 505 of the core and strikes against a pilot 506 of member 54 when the core is placed on the locator, thereby knocking said member from the deflected conductor ends.

Knockout provision for core

Figure 4:
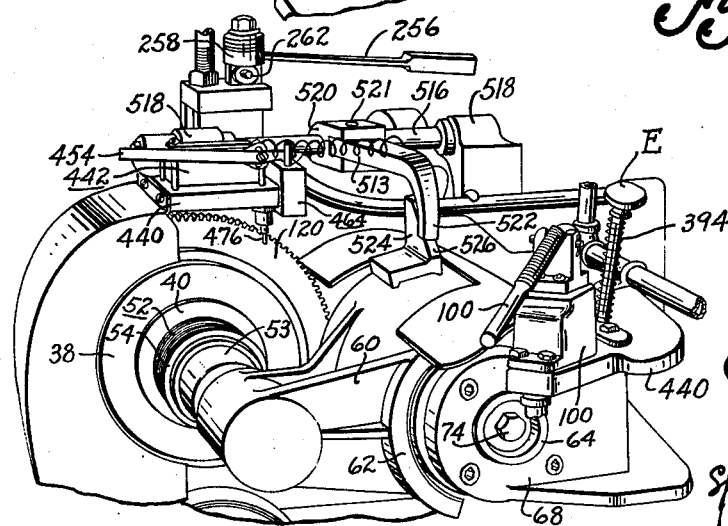
Fig. 4 is a fragmentary perspective view of the machine similar to Fig. 3, showing certain elements in a different position of operation, however.
Figure 5:
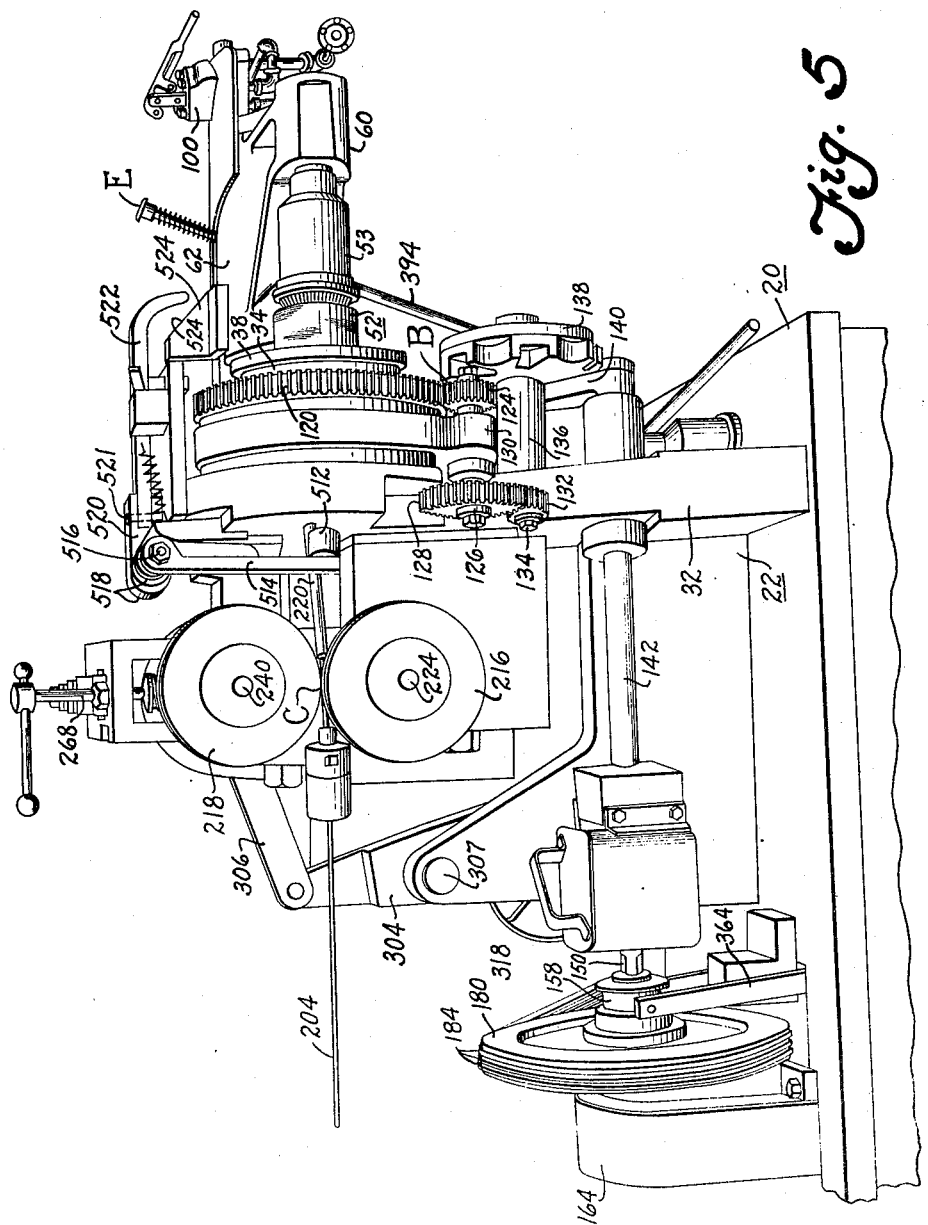
Fig. 5 is a fragmentary perspective view of the machine as viewed from the side.
Figure 6:
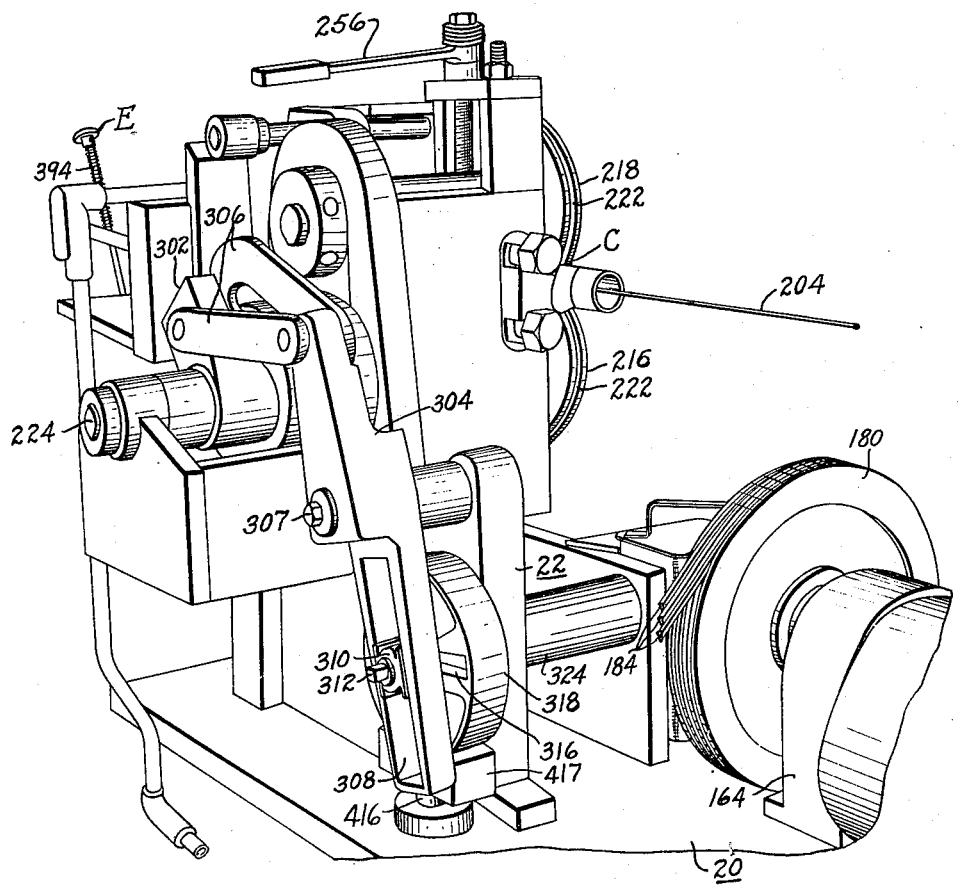
Fig. 6 is another fragmentary perspective view of the machine.

Referring more particularly to Figs. 3 to 5 inclusive, and 10, the support 30 and locating disc 40 are centrally recessed at 510 slidably to receive a knockout bar 512. As best shown in Fig. 5, this knockout bar 512 is adapted to be engaged by the free end of a lever 514 which is mounted on a stub shaft 516, journaled in suitable bearings 518 on the frame wall 32. Also mounted on the stub shaft 516 is a short lever 520 to which an operating lever 522 is pivoted for rotation about an axis at right angles to the stub shaft 516. The operating lever 522 may thus be rocked in two different planes as can be readily understood. Adapted to cooperate with the lever 522 is a cam lug 524 which is mounted on the cylinder 62. The cooperation between lever 522 and cam lug 524 is such that during withdrawal of the cylinder 62 and clamp 53 from the position shown in Figs. 4 and 10, the inclined surface 526 of said cam lug engages and rocks the operating lever 522 in counter-clockwise direction as viewed in Figs. 3 and 5, thereby moving the knockout bar 512 to the right as viewed in Fig. 5 or to the left as viewed in Fig. 10 to remove a core 52 from seating engagement with the locating disc 40. Of course, such cooperation between lever 522 and cam lug 524 takes place only after the clamp 53 is sufficiently withdrawn from the core 52 so as not to interfere with the forced movement of said core from seating engagement with the locating disc 40. The knockout bar 512 does not entirely remove the core 52 from the locating pins 48 but just sufficiently to enable the operator to get his fingers between the unseated core and the locating disc for complete removal of the core from the locating pins 48. The operating lever 522 returns by gravity into the inoperative position shown in Figs. 3 and 5 immediately after the cam lug clears said lever and before the clamp 53 reaches the most retracted position shown in Fig. 3, so that a new core 52, which is placed on the locating disc 40 by the operator, pushes the projecting knockout bar 512 into the position in Fig. 10 without opposition from the lever 514. After a new core has been placed on the locating disc 40, cylinder 62 and clamp 53 are returned into the position shown in Figs. 4 and 10, during which movement the cam lug 524 laterally engages the lever 522, while the clamp 53 swings into alignment with the locator core 52, thereby rocking the lever 522 about its pivot 521 out of the path of movement of the cam lug 524, i. e. against the tendency of a spring 513 to force said lever 522 into operative alignment with said cam lug. Hence, there is no interference between the cam lug 524 and the lever 522 while the clamp 53 returns into clamping position.

Mode of operation

While the clamp 53 is in the inoperative position of Fig. 3, the operator of the machine places a core 52 and a deflecting member 54 on the locating disc 40 with the locating pins 48 extending through the core recesses and the recesses 500 of said deflecting member. A thus located core has all its conductor receiving holes 208 in alignment with the holes 206 of the locating disc 40. The operator next shifts the valve 104 from the dot-and-dash position to the full-line position shown in Fig. 10, thereby causing alignment of the clamp 53 with the located core 52 and movement of said clamp into forced engagement with the deflecting member 54 on said core. The machine is now ready for operation and the operator depresses the pushrod 394, thereby causing engagement of the jaw clutch 158 in the earlier described manner. The first operation to be performed by the machine consists in feeding the bar stock 204 into aligned holes 206 and 208 of locator 40 and core 52, respectively, until the leading end of the bar stock projects a preassigned distance beyond the core end face 600 and is slightly deflected by the member 54 as illustrated in Fig. 10. At the conclusion of the first feeding operation, the locator 40 with the core 52 and member 54 is indexed to align the consecutive, aligned holes 206 and 208 of locator and core with the bar stock 204. The first deposited conductor is shorn from the bar stock at the very start of this indexing operation in the earlier explained manner. The thickness of the locating disc 40 determines the length of the conductor that extends beyond the opposite core end face 600. After the locating disc has been indexed, the bar stock 204 is again fed through the consecutive, aligned holes 206, 208 of the locator and core for deposition of a conductor length therein, to be severed from the bar stock during the next indexing operation. Thus, feeding of the bar stock alternates with indexing of the locator and intermittent severance of inserted conductor lengths from the bar stock. While these alternate operations take place, the locator 40 and core 52 thereon are intermittently rotated through one revolution, whereby consecutive holes 208 of the core 52 successively receive a conductor 358, all of which are of the same length as can be readily understood. Near the end of one revolution of the locator 40, the cam lug 480 which is rotatable with said locator, approaches the switch operating pin 476 and forces the same into the switch closing position shown in Fig. 16, thereby causing energization of the solenoid 426 and disengagement of the jaw clutch 158 in the earlier described manner. The cam lug 480 is so angularly adjusted on the ring gear 120 as to cause closing of the switch 442 while the Geneva driving gear 140 is in locking engagement with the driven Geneva gear 138 but not in driving engagement therewith, and while the crank-arm 302 is rocked in a direction opposite to the earlier explained feeding direction. To accomplish this, the operations of the indexing device B and the feeding device C are so coordinated that there is a lapse of time between a completed feeding operation and the start of an indexing operation which is of sufficient duration to permit automatic clutch disengagement and a complete stop of the machine by the structure provided for this purpose. Hence, the same conductor receiving hole 206 of the locator 40 is always in alignment with the stationary steel bushing 350 and consequently with the bar stock 204, while the machine is at rest, meaning that the machine is ready for the first feeding operation immediately after its start.

For replacing a supply of bar stock, the same is brought into cooperation with the feeding discs 216, 218, whereupon the machine is started as though for operation on a located core, although this time no core is placed in the machine. By properly manipulating the hand lever 256 at any time during the operation of the machine, the operator permits feeding of the bar stock until the same is shorn for the first time, whereupon the following feeding step or steps of the bar stock are prevented until the machine comes to an automatic stop.

The present machine is so constructed as to operate on rotor cores of different diameters and of varying numbers of conductor receiving holes, because the locator 40 is interchangeable, the bar stock directing guide is adjustable within reasonable limits, and certain gears in the drive for the indexing device B may be inter-changed. The adjustment of the machine to a different number of indexing steps to accommodate a different number of conductor holes of a certain core does not interfere with the feeding operations of the machine since the same automatically alternate with the indexing operations. Also, the amount of feed of the bar stock for each feeding operation may be conveniently adjusted due to the provision of the disc 318 and the radially adjustable crank pin 310 thereon. Furthermore, the automatic stop of the machine is responsive to substantially one revolution of the locator 40 and entirely independent of any number of intermittent cycles of one revolution of said locator. The clamp 53 adjusts itself to any core of varying heighth since fluid pressure effects movement of said clamp into operative position.

The present machine is especially remarkable for its extremely high, yet safe, operating speed. An actually constructed machine delivered 300 conductors per minute without showing the least strain or excessive wear on the operating elements, nor did the high operating speed of the machine have any adverse influence upon the uniformity of the delivered conductors. The rugged construction of the present machine and the ingenious cooperation between the operating devices thereof, are instrumental in safely permitting an operating speed such as the one above mentioned. The efficiency of the machine is, consequently, unusually high, especially since the loading and unloading of the machine, as well as the start thereof, is accomplished by the operator during a minimum period of time.

While the embodiment of the present invention as herein disclosed, constitutes a preferred form, it is to be understood that other forms might be adopted, all coming within the scope of the claims which follow.

What is claimed is as follows:

1. In a machine of the character described, the combination of a locator for a core having longitudinal recesses; a guide for bar stock; a device for aligning consecutive core recesses with the guide; another device for feeding bar stock into an aligned recess; and means for alternately operating both devices.

2. In a machine of the character described, the combination of a locating member for a core having circularly disposed longitudinal recesses; and a guide member for directing bar stock into an aligned recess, one of the members being rotatable about an axis centrally of the recesses and parallel to the core axis to permit alignment of any recess with the guide member.

3. In a machine of the character described, the combination of a locating member for a core having circularly disposed longitudinal recesses; a guide member for directing bar stock into an aligned recess, one of the members being rotatable about an axis centrally of the recesses and parallel to the core axis to permit alignment of any recess with the guide member; and means between the core and guide member for severing a length from the bar stock.

4. In a machine of the character described, the combination of a locating member for a core having circularly disposed longitudinal recesses in registry with correspondingly disposed recesses of said member; another member having an opening to direct bar stock into an aligned recess of the locating member, one of the members being rotatable about an axis centrally of the recesses and parallel to the core axis to align any recess of the locating member with the opening; and means between both members to sever from the bar stock a length projecting into any registering recesses of core and locating member.

5. In a machine of the character described, the combination of a locating member for a core having circularly disposed longitudinal recesses in registry with correspondingly disposed recesses of said member; and another member having an opening to receive and direct bar stock into an aligned recess of the locating member, both members abutting each other and one of the members being rotatable about an axis centrally of the recesses and parallel to the core axis to align any recess of the locating member with the opening and to cause shearing cooperation between terminating edges of opening and aligned recess of the locating member in the abutting plane of both members for severance of a length from the bar stock.

6. In a machine of the character described, the combination of a locating member for a core having circularly disposed parallel recesses; a guide member for directing bar stock into an aligned recess, one of the members being rotatable about an axis centrally of and parallel to the recesses to permit alignment of any recess with the guide member; and means for alternately feeding bar stock toward the core and indexing the rotatable member.

7. In a machine of the character described, the combination of a locating member for a core having circularly disposed parallel recesses; a guide member for directing bar stock into an aligned recess, one of the members being rotatable about an axis centrally of and parallel to the recesses to permit alignment of any recess with the guide member; means severing a length from the bar stock upon rotation of said one member; and means for alternately feeding bar stock toward the core and indexing said one member.

8. In a machine of the character described, the combination of a locator for a core having longitudinal recesses; a guide for bar stock; means for aligning the guide with any core recess; means for feeding the bar stock through an aligned recess; and means having a tapered surface adjacent each core recess to engage and deflect the leading end of the fed bar stock as it emerges from a recess.

9. In a machine of the character described, the combination of a locator for a core having longitudinal recesses; a guide for bar stock; a device for aligning the guide with consecutive core recesses; another device for feeding bar stock into an aligned recess; a prime mover; a driving connection between the prime mover and both devices for alternately operating the latter; means for severing a fed length from the bar stock; and means for automatically interrupting said driving connection after severance of a fed length in the last core recess from the bar stock.

10. In a machine of the character described, the combination of a locator for a core having longitudinal recesses; a guide for bar stock; a device for aligning the guide with consecutive core recesses; another device for feeding bar stock into an aligned recess; means severing a fed length from the bar stock upon disalignment of the guide with a recess; a prime mover; a driving connection between the prime mover and both devices for alternately operating the latter; and means for automatically interrupting said driving connection after severance of a fed length in the last core recess from the bar stock.

11. In a machine of the character described, the combination of a locator for a rotor core; movable structure including a member for engaging and clamping a core against the locator; and means cooperating with said structure for disaligning the member from a located core upon retraction of the structure from said core, and for aligning said member with a located core upon reverse movement of the structure.

12. In a machine of the character described, the combination of a locator for a rotor core; a stationary piston out of alignment with a located core; an axially movable cylinder journaled on the piston, said cylinder having an extending arm to engage and clamp the core against the locator; a cam member; a follower member, one of said members being stationary and the other movable with the cylinder and both members cooperate to turn the cylinder about the piston upon axial movement of the cylinder to align or disalign the arm with a located core.

13. In a machine of the character described, the combination of a stationary member; a locator for a core having circularly disposed and substantially parallel longitudinal recesses, said locator being supported by the member for rotation about an axis centrally of the recesses and parallel to the core axis; and a guide supported within the stationary member and having a conductor receiving and guiding orifice eccentrically of its axis of rotation of the locator to permit accurate alignment of said orifice with a recess.

14. In a machine of the character described, the combination of a locator for a core having circularly disposed and substantially parallel longitudinal recesses in registry with correspondingly disposed recesses of said member; a stationary member; an element removably carrying the locator and being journaled on the member for rotation about an axis centrally of the registering recesses and parallel to the core axis; and a guide supported by the member for rotation about an axis parallel to the recesses and having a conductor receiving and guiding orifice eccentrically of its axis of rotation to permit accurate alignment of said orifice with a recess of the locator.

15. In a machine of the character described, the combination of a support to seat a laminated core and having depending pilots to register with longitudinal recesses of the core; a clamp movable axially of the core to press the same against the support; a pin movable axially of the core for pushing the same from seating engagement with the support; and means forcing the pin toward the core during an early cycle only of the necessary receding movement of the clamp from the core to permit its removal from the pilots.

16. In a machine of the character described, the combination of a device for depositing conductors successively in longitudinal recesses of a core; a prime mover; a normally disengaged clutch for drivingly connecting the prime mover with the device; means locking the clutch in engaged position; and means rendering the locking means ineffective upon deposition of a conductor in the last empty recess.

17. In a machine of the character described, the combination of a rotary support for a core having longitudinal recesses; a device for indexing the support and depositing conductors in successive core recesses; a prime mover; a normally disengaged clutch for drivingly connecting the prime mover with the device; means locking the clutch in engaged position; means including a solenoid for rendering the locking means ineffective; an electric circuit including a normally open switch for energizing the solenoid; and means closing the switch in response to substantially one complete revolution of the support.

18. In a machine of the character described, the combination of a feeding device including a rotary disc; power driving means; a clutch for drivingly connecting the power driving means with the device; means including a pivotally mounted lever for engaging the clutch; and a normally ineffective brake for the disc, said brake being rendered effective in response to rocking of the lever into clutch disengaging position.

19. In a machine of the character described, the combination of a locating member for a core having circularly disposed longitudinal recesses; a guide member for directing bar stock into a core recess, one of the members being rotatable to align any recess with the guide member; a device for indexing the rotatable member and including Geneva gears; a device for feeding guided bar stock into an aligned recess, said device including a rotary disc; means severing a length in a recess from the bar stock during an initial cycle of an indexing step of the movable member; power driving means; a driving connection between said power means and both devices for alternately operating the latter, said connection including a normally yieldingly disengaged clutch; means locking the clutch in engaged position; means including a pivotally mounted lever for engaging the clutch; a normally ineffective brake for the disc, said brake being rendered effective in response to rocking of the lever into clutch disengaging position; and means releasing the engaged clutch after severance of the last inserted length from the bar stock and before the Geneva driving gear rotates the Geneva driven gear for a new indexing step of the rotatable member.

20. In a machine of the character described, the combination of rotatable members cooperating to feed bar stock therebetween, one member being bodily immovable and the other member being pivoted for rotation about an axis transverse to its axis of rotation; and means including a rotatable lever for normally preventing rotation of said other member about its pivot axis and for permitting such rotation upon rocking of the lever through a small cycle of one revolution.

21. In a machine of the character described, the combination of a supporting member for a core having a circular row of through openings; a guide member for directing a conductor wire into an aligned opening, one of the members being rotatable about the other yet permitting alignment of any opening with the guide member; means for anchoring the free end of the wire with respect to the core after it projects through the opening of the core; and means between the core and guide member for severing a length from the conductor wire.

22. In a machine of the character described, the combination of a locator for a rotor core; a stationary annular member supported out of alignment with a located core; a sleeve provided with a cam slot journaled on the annular member and adapted for longitudinal movement thereon; a clamping member carried by the sleeve for holding the core against the support; a roller supported in a fixed relation relative to the sleeve and extending into the cam slot; means for moving the sleeve in either direction on the stationary member whereby the roller and cam slot cooperate with each other to align or disalign the clamping member with a located core.

23. A machine of the character described comprising, in combination, a rotatable plate for supporting a plurality of core laminations each having a circular row of holes concentric with its axis and having a locating opening in a definite relation to said row of holes, said plate having provisions for supporting said laminations in axial alignment with the axis of said plate and means cooperating with the locating openings of said laminations to maintain the circular rows of openings of said laminations in alignment thereby providing core recesses; means rotatable with the plate for clamping the laminations against the plate; a guide for bar stock; means for rotating the plate to align the core recesses successively with the guide; means for feeding the bar stock into the aligned recesses; and means for severing a length of bar stock.

24. A machine of the character described comprising, in combination, a rotatable plate for supporting a plurality of core laminations each having a circular row of holes concentric with its axis and having a locating opening in a definite relation to said row of holes, said plate having provisions for supporting said laminations in axial alignment with the axis of said plate and means cooperating with the locating openings of said laminations to maintain the circular rows of openings of said laminations in alignment thereby providing core recesses said plate having a circular row of openings respectively in alignment with the core recesses; means rotatable with the plate for clamping the laminations against the plate; a guide for bar stock; means for rotating the plate to align the core recesses successively with the guide; means for feeding the bar stock into the aligned recesses; and means for shearing the bar stock and including the plate as one shear member and the guide as the other shear member.

25. A machine of the character described comprising, in combination, a rotatable plate for supporting a plurality of core laminations each having a circular row of holes concentric with its axis and having a locating opening in a definite relation to said row of holes, said plate having provisions for supporting said laminations in axial alignment with the axis of said plate and means cooperating with the locating openings of said laminations to maintain the circular rows of openings of said laminations in alignment thereby providing core recesses said plate having a circular row of openings respectively in alignment with the core recesses; means rotatable with the plate for clamping the laminations against the plate a guide for bar stock; means for rotating the plate to align the core recesses successively with the guide; means for feeding the stock into the aligned recesses; means for shearing the bar stock and including the plate as one shear member and the guide as the other shear member, and means for moving the core and the sheared stock from the recesses of the plate during the initial receding movement of the clamping means from the core to permit its removal from the supporting means.

26. In a machine of the character described, the combination of a plate for supporting a plurality of core laminations each having a circular row of holes; pilots carried by plate for maintaining the circular rows of the laminations in alignment; a clamp movable axially of the laminations to press the laminations against the support; means for feeding bar stock into the aligned holes; means for severing a length of bar stock and means for forcing the core from the plate during the early cycle of the receding movement of the clamp from the core to permit its removal from the pilots.

27. In a machine of the character described, the combination of a plate for supporting a plurality of core laminations each having a circular row of holes; pilots carried by plate for maintaining the circular rows of the laminations in alignment; a clamp movable axially of the laminations to press the laminations against the support; means for feeding bar stock into the aligned holes; means for deflecting the leading end of the fed bar stock as it emerges from a hole to hold the laminations together; means for severing a length of bar stock; and means for forcing the core a short distance from the plate during the initial receding movement of the clamp from the core to permit its removal from the pilots.

GEORGE W. ELSEY.
LAWSON E. MUMMA.
EDWARD J. VOSLER.